United States Patent [19]  
Iizuka et al.

[11] Patent Number: 4,645,826  
[45] Date of Patent: Feb. 24, 1987

[54] PROCESS FOR PRODUCTION OF HIGH TO ULTRA-HIGH MOLECULAR WEIGHT LINEAR POLYARYLENESULFIDES

[75] Inventors: Yo Iizuka; Takao Iwasaki; Takayuki Katto; Zenya Shiiki, all of Fukushima, Japan

[73] Assignee: Kureha Kagaku Kogyo Kabushiki Kaisha, Tokyo, Japan

[21] Appl. No.: 746,252

[22] Filed: Jun. 18, 1985

[30] Foreign Application Priority Data

Jun. 20, 1984 [JP] Japan ................... 59-126725  
Sep. 8, 1984 [JP] Japan ................... 59-188533

[51] Int. Cl.⁴ .............................. C08G 75/14  
[52] U.S. Cl. ...................... 528/388; 525/537  
[58] Field of Search ............... 528/388; 525/537

[56] References Cited

U.S. PATENT DOCUMENTS 3,354,129 11/1967 Edmonds, Jr. .  
3,524,835 8/1970 Edmonds, Jr. et al. .  
3,607,843 9/1971 Vidaurri, Jr. .  
3,717,620 2/1973 Rohlfing .  
3,919,177 11/1975 Campbell .  
4,038,259 7/1977 Campbell et al. .  
4,038,260 7/1977 Campbell .  
4,038,261 7/1977 Crouch et al. .  
4,038,262 7/1977 Edmonds, Jr. .  
4,038,263 7/1977 Edmonds, Jr. et al. .  
4,039,518 8/1977 Campbell .  
4,282,347 8/1981 Tieszen et al. .  
4,331,801 5/1982 Idel et al. .  
4,362,864 12/1982 Idel et al. .  
4,368,321 1/1983 Sherk et al. .................. 528/388  
4,415,729 11/1983 Scoggins et al. .  
4,510,297 4/1985 Moberly .  
4,524,200 6/1985 Sherk et al. .................. 528/388  
4,537,953 8/1985 Kawakami et al. .

Primary Examiner—Melvyn I. Marquis  
Attorney, Agent, or Firm—Wenderoth, Lind & Ponack

[57] ABSTRACT

By maintaining an arylenesulfide prepolymer with a melt viscosity of 5 to 3,000 poise at a temperature of 245° to 290° C. under a liquid-liquid two-phase separated state in a solvent for 1 to 50 hours, the molecular weight of said prepolymer is increased to a high to ultra-high value while the linearity of the polymer is retained.

17 Claims, No Drawings

PROCESS FOR PRODUCTION OF HIGH TO ULTRA-HIGH MOLECULAR WEIGHT LINEAR POLYARYLENESULFIDES

BACKGROUND OF THE INVENTION

This invention relates to a process for producing a polyarylene sulfide (hereinafter abbreviated as PAS), and more particularly to a novel process for producing a high to ultra-high molecular weight linear PAS at low cost without use of a crosslinking agent or an organic acid salt in its production.

In recent years, highly heat-resistant thermoplastics are increasingly demanded for parts such as those for electrical instruments and motor vehicles.

PAS has properties which can meet such demands. However, it is difficult to obtain this PAS as represented by polyphenylenesulfide of an amply high molecular weight. Consequently, this situation gives rise to the problem of extreme difficulty in obtaining particularly fibers and films for which high strength is required or molded articles for which high impact strength is required.

The present invention provides a process for producing inexpensively a markedly high molecular weight linear PAS in order to overcome these problems.

PRIOR ART

As a typical process for production of PAS, Japanese Patent Publication No. 3368/1970 discloses a process in which a dihalo-aromatic compound is reacted with sodium sulfide in an organic amide solvent such as N-methylpyrrolidone. However, the PAS produced by this process has low molecular weight and melt viscosity, and it is difficult to fabricate it into a film, sheet or fiber.

Under such a state of the art, various proposals have been made to improve the process as mentioned above in order to obtain PAS with higher polymerization degree. In the most typical process as disclosed in Japanese Patent Publication No. 12240/1977, an alkali metal carboxylate is employed as the polymerization aid in the above reaction system. According to this process, it is necessary to use the polymerization aid in an amount substantially equimolar to the alkali metal sulfide. Further, for obtaining PAS with higher polymerization degree, an expensive lithium or sodium benzoate among various polymerization aids is required for use in a large amount. This requirement results in increased production cost of PAS, resulting in commercial disadvantage. Also, according to this process, a large amount of organic acid may be entrained in the disposed waste water during recovery of PAS after polymerization reaction, whereby problems in pollution may be caused. For prevention of such problems, enormous costs are undoubtedly necessary, thus involving serious problems from the viewpoint of economy.

In another proposed process for obtaining PAS with high polymerization degree, a trivalent or higher polyhalo-aromatic compound is used as a crosslinking agent or a branching agent, or a polymer is subjected to high temperature treatment in the presence of oxygen (reference: Japanese Laid-Open Patent Publication No. 136100/1978, etc.). According to this process, it is possible to obtain easily a high molecular weight PAS having an apparent melt viscosity of some tens of thousands poise. However, since this PAS is a polymer crosslinked or branched to a high degree, it has poor fiber-forming property, and it is difficult to mold it into films or fibers. Also, even if molded articles could be obtained, there is still the problem of their being mechanically extremely fragile because their molecular chains are basically short.

SUMMARY OF THE INVENTION

In view of the above circumstances, we have made investigations in detail on the polymerization mechanism in a simple polymerization system of an alkali metal sulfide and a dihalo-aromatic compound, in order to develop a process for producing a PAS which has high melt viscosity and yet is linear at low cost without use of a polymerization aid such as alkali metal carboxylates. As a result, it has now been found, surprisingly, that a linear PAS of a markedly high molecular weight with a melt viscosity of about some thousands to some tens of thousands poise can be readily produced without the use of an aid by forming a PAS prepolymer of low to medium molecular weight according to a preliminary polymerization, then elevating the temperature by heating the polymerization system under strongly alkaline conditions with addition of a phase separating agent to the polymerization system, thereby separating the system into two liquid phases of high viscosity phase (polymer solution phase) and low viscosity phase (solvent phase), and carrying out the reaction under such a state.

Thus, the process for producing the high molecular weight to ultra-high molecular weight linear polyarylenesulfide according to the present invention comprises carrying out a two-phase separated polymerization comprising dissolving an arylenesulfide prepolymer having a melt viscosity of 5 to 3,000 poise (at 310° C., shearing rate=200 (sec)$^{-1}$) in a poor solvent under a strongly alkaline condition (in a pH range of from 9.5 to 14 of the reaction mixture when diluted 10-fold with water) in a temperature range of from 245° C. to 290° C. into a liquid-liquid two-phase separated state and maintaining this state for 1 to 50 hours to convert the arylenesulfide prepolymer into a high molecular weight polymer, then separating the polymer from the polymerization system and purifying the polymer after neutralization.

The polymerization mechanism of the present invention has not yet completely been clarified, but the main mechanism may be hypothesized to be a synergetic mechanism of "condensation polymerization" and "phase separation". Regardless of the true nature of the mechanism, it may certainly be considered that the separating action between the two liquid-liquid phases is an important point. To explain schematically the polymerization mechanism, the main mechanism may be considered to consist of a condensation polymerization mechanism in which the polymer terminal groups participate in the reaction as shown below in the reaction scheme (1) and the eliminating separating action of the MX (salt) which is the reaction product through migration to the solvent phase during phase separation into two liquid-liquid phases of the polymer solution phase and the solvent phase, or alternatively the contact preventing action between harmful substances (presumably organic sulfur compounds, etc.) which may promote decomposition of the polymer chains and the polymer formed, as well as the fractionating action of low molecular weight oligomers which have migrated into the above solvent phase.

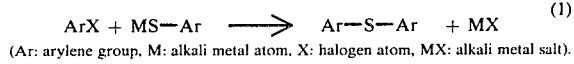

(Ar: arylene group, M: alkali metal atom, X: halogen atom, MX: alkali metal salt).

Although it has not been ascertained thus far whether the above mechanism is the main one, a prepolymer can be allowed to react under strongly alkaline, high temperature and liquid-liquid two-phase separation conditions to form to a high molecular weight or ultra-high molecular weight polymer, regardless of the mechanism involved. Accordingly, this reaction is described tentatively as "two-phase separated polymerization".

In contrast, polymerization conducted in an organic amide solvent with small water content as in the prior art, in which the polymer formed is dissolved substantially homogeneously at a higher temperature (above about 235° C.) with forming substantially one liquid phase and also the polymer formed is practically precipitated from the system at a lower temperature (below about 235° C.) with forming substantially one liquid phase. Such phase is described as "preliminary polymerization" hereinafter.

For carrying out the two-phase separated polymerization of the present invention, a prepolymer to form the polymer phase is required, but it is difficult to subject products of an alkali metal sulfide and a dihalo-aromatic hydrocarbon directly to the two-phase separated polymerization. On the other hand, preliminary polymerization of the starting materials of an alkali metal sulfide and a dihalo-aromatic hydrocarbon in an organic amide with a small water content can be readily carried out to form a low to medium molecular weight polyarylenesulfide.

Therefore, for obtaining a high to ultra-high molecular weight polyarylenesulfide, it is necessary to carry out continuously the preliminary polymerization and the two-phase separated polymerization. The present invention is practiced by such a continuous process.

Further, for obtaining particularly an ultra high molecular weight PAS with a melt viscosity of 7,000 poise or higher, it is effective to employ the process in which a low to medium molecular weight arylenesulfide prepolymer formed by the preliminary polymerization is separated once from the polymerization system and purified before it is returned again to the polymerization system for carrying out the liquid-liquid two-phase separated polymerization. This procedure for obtaining the ultra-high molecular weight PAS is also one of the techniques of the present invention.

According to the process of the present invention, even an ultra-high molecular weight linear PAS with a melt viscosity of 10,000 poise or higher can easily be produced without the aid of a crosslinking agent or an expensive polymerization aid (e.g., carboxylates). Since no crosslinking agent is employed, the PAS obtained is linear, and filaments or films can easily be formed therefrom. Also, molded articles from this polymer possess excellent mechanical properties. The process is also very economically advantageous without the possibility of pollution because no polymerization aid (e.g., organic carboxylates) is employed.

DETAILED DESCRIPTION OF THE INVENTION

The process for production of a high to ultra-high molecular weight PAS according to the present invention comprises, basically, forming PAS molecules through bonding between an alkali metal sulfide and a dihalo-aromatic compound and/or converting the PAS molecules into a high molecular weight polymer.

Starting Materials

Alkali metal sulfide

The alkali metal sulfide to be used in the present invention includes lithium sulfide, sodium sulfide, potassium sulfide, rubidium sulfide, cesium sulfide and mixtures thereof. These alkali metal sulfides can be used as hydrates or aqueous mixtures, or in anhydrous forms.

Among these alkali sulfides, sodium sulfide is the least expensive and is commercially preferred.

It is also possible to use a small amount of an alkali metal hydroxide in combination in order to neutralize an acidic salt (e.g., alkali metal disulfides and alkali bicarbonates) which may sometimes occur in minute amount in an alkali metal sulfide.

Dihalo-aromatic compound

The dihalo-aromatic compound to be used in the present invention can be, for example, any of dihalo-aromatic compounds as disclosed in Japanese Laid-open Patent Publication No. 22926/1984. Particularly preferred are p-dichlorobenzene, m-dichlorobenzene, 2,5-dichlorotoluene, 2,5-dichloro-p-xylene, p-dibromobenzene, 1,4-dichloronaphthalene, 1-methoxy-2,5-dichlorobenzene, 4,4'-dichlorobiphenyl, 3,5-dichlorobenzoic acid, p,p'-dichlorodiphenylether, p,p'-dichlorodiphenylsulfone, p,p'-dichlorodiphenylsulfoxide, p,p'-dichlorodiphenylketone, and the like. Among these, those composed mainly of para-dihalobenzene, typically p-dichlorobenzene, are especially preferred.

By appropriate selection and combination of dihalo-aromatic compounds, a random or block copolymer containing two or more different reaction units can be obtained. For example, when employing p-dichlorobenzene in combination with m-dichlorobenzene or p,p'-dichlorodiphenylsulfone, a random or block copolymer containing:

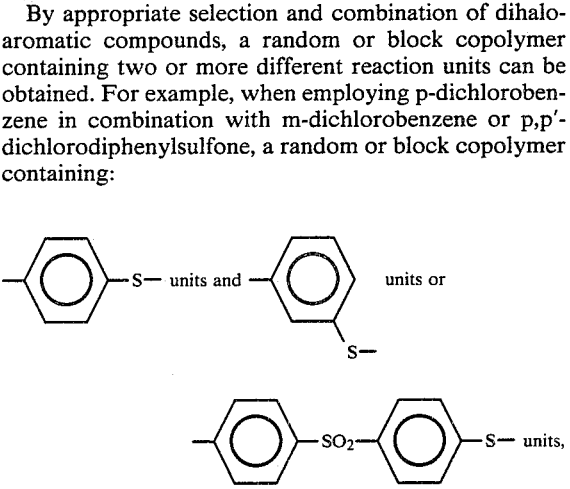

can be obtained. Further, a small amount of a polyhalo-aromatic compound (e.g., trichlorobenzene) within the range which will not impair linearity may also be employed in combination, but no such compound is ordinarily required.

Polymerization solvent

The organic amide solvent to be used in the polymerization step for forming the prepolymer of the present invention (preliminary polymerization step) can be selected from N-methylpyrrolidone (NMP), N-ethyl-pyrrolidone, N,N-dimethylformamide, N,N-dimethylacetamide, N-methylcaprolactam, tetramethylurea, hexamethylphosphorotriamide, and mixtures thereof. Among these, N-methylpyrrolidone is particularly preferred from viewpoints such as chemical stability and ability to produce readily a high molecular weight polymer. The organic amide as the polymerization solvent is desirably an aprotic compound.

Also in the polymerization step for forming an ultra-high molecular linear polymer from the prepolymer of the present invention, the above organic amide can of course be used. Otherwise, it is also possible to employ, for example, aromatic hydrocarbons ($C_6$-$C_{30}$), aliphatic hydrocarbons ($C_6$-$C_{30}$), ethers ($C_5$-$C_{30}$), ketones ($C_5$-$C_{30}$), pyridine or quinoline or derivatives of these ($C_5$-$C_{30}$), and mixtures thereof as such or as mixtures with organic amides.

Polymerization Process

The process for production of the high to ultra-high molecular weight PAS of the present invention is inclusive of the process [A] comprising the steps of preliminary polymerization and two-phase separated polymerization or the process [B] comprising the steps of preliminary polymerization, prepolymer separation (cleaning), and two-phase separated polymerization. The process [A] is an economical process for production of high molecular weight PAS having a melt viscosity up to about 7,000 poise, while the process [B] comprising more steps than the process [A] is suitable for production of an ultra-high molecular weight PAS having a melt viscosity higher than 7,000 poise. The process [A] and the process [B] will now be described in detail.

Process [A]

For preparation of the arylensulfide prepolymer (5-3,000 poise) to be used for this process, a simple preliminary polymerization process, in which it is prepared by allowing an alkali metal sulfide to react with a dihalo-substituted aromatic compound in an organic amide solvent, or an improved preliminary polymerization process, in which a prepolymer with a greater molecular weight is prepared by permitting an organic carboxylic acid alkali salt, $Ca(OH)_2$, $CaO$, etc. to coexist in the reaction system, can be applied. However, in the process [A], since the polymerized slurry formed in the preliminary polymerization is used as such in the subsequent two-phase separated polymerization, the simple system without the co-presence of any third substance is preferred.

The process [A] is commercially a very economical process in that the preliminary polymerization step and the two-phase separated polymerization step can be readily practiced continuously.

First, the step of forming a low to medium molecular weight prepolymer should desirably be performed by carrying out polymerization in a polymerization reaction system containing 0.5 to 2.4 moles of water per mole of the alkali metal sulfide at a temperature in the range of from 160° to 270° C., particularly from 180° to 235° C., until the conversion of the dihalo-aromatic compound becomes 70 mole % to 8 mole % (or until the residual alkali metal sulfide becomes 30 mole % or less) to form a PAS having a melt viscosity of 5 to 300 poise [in the present invention, the melt viscosity is measured at 310° C. at a shearing rate of 200(sec.)$^{-1}$].

In practicing the process, first, an alkali metal sulfide and a dihalo-aromatic compound are added into an organic solvent, desirably under an inert gas atmosphere, and the temperature is elevated to a desired temperature at which the reaction is carried out. Here, if the water content in the alkali metal sulfide is less than the desired content, the necessary amount of water is added for supplementation. If it is too much, according to the method known to those skilled in the art, the temperature of the solvent (and the alkali metal sulfide) is raised from 150° C. to about 210° C., the unnecessary amount of water is expelled out of the system before addition of the dihalo-aromatic compound.

During this operation, if an excessive amount of water is removed, the quantity corresponding to shortage is supplemented by addition of water. The amount of the co-existing water in the polymerization system is within the range of from 0.5 mole to 2.4 moles per mole of the alkali metal sulfide charged. Particularly, the range of from 1.0 mol to 2.0 moles will readily afford a high molecular weight PAS as the PAS finally obtained. At a level less than 0.5 mole, undesirable reactions such as decomposition of the PAS formed will occur. On the other hand, at a level in excess of 2.4 moles, decomposition reactions of the solvent or the PAS formed may occur, or the polymerization rate may become markedly smaller. Thus, quantities outside of the above range are not desirable.

The preliminary polymerization is preferably conducted at a temperature in the range of from 160° to 260° C., particularly from 180° to 235° C. At a temperature lower than 160° C., the reaction rate is too slow, while at a temperature over 260° C., the PAS formed is liable to be decomposed to produce only a PAS with extremely low melt viscosity.

The amount of the dihalo-aromatic compound used is desirably within the range of from 0.9 mole to 1.1 moles per mole of the alkali metal sulfide, particularly preferably from 0.98 mole to 1.05 moles, in order to obtain a high molecular weight PAS. An amount less than 0.9 mole or over 1.1 moles is not preferable, since such an amount causes difficulty in producing a PAS with high melt viscosity suitable for working.

The end point of the preliminary polymerization step, that the timing of turning from the preliminary polymerization to the two-phase separated polymerization, is preferably the point when the conversion of the dihalo-aromatic compound has reached 70 mole % to 98 mole %. With a conversion less than 70 mole %, undesirable reactions such as decomposition may occur due to the influence of the alkali metal sulfide (30 mole % or more). On the contrary, if the conversion exceeds 98 mole %, it will be difficult to obtain PAS of a high polymerization degree, even if the two-phase separated polymerization is performed, probably because the polymerization system becomes denatured. A conversion of about 85 mole % to 95 mole % is preferable for obtaining stably a PAS of a high polymerization degree.

Here, the conversion of a dihalo-aromatic compound is calculated according to the formulae shown below.

(a) In the case when a dihalo-aromatic compound (abbreviated DHA) is added in excess of an alkali metal sulfide in terms of molar ratio:

Conversion =

$$\frac{DHA \text{ charged (moles)} - Residual\ DHA \text{ (moles)}}{DHA \text{ charged (moles)} - Excessive\ DHA \text{ (moles)}} \times 100$$

(b) In other cases than (a):

Conversion =

$$\frac{DHA \text{ charged (moles)} - Residual\ DHA \text{ (moles)}}{DHA \text{ charged (moles)}} \times 100$$

At the point of turning from the preliminary polymerization to the two-phase separated polymerization, the melt viscosity of the PAS is preferably in the range of from 5 to 300 poise. The range of from 10 poise to 200 poise is more suited for obtaining a PAS of a high polymerization degree with a melt viscosity of 1,000 poise or higher. With a viscosity less than 5 poise, formation of two-phase separation is insufficient, whereby decomposition of the polymerization system or lowering of the reaction rate will readily occur. With a viscosity over 300 poise, harmful substances which will promote polymer cleavage will be accumulated in greater amount, whereby lowering in polymer yield and decomposition of the polymer system will undesirably be caused.

In the two-phase separated polymerization in the process [A] of the present invention, water is preferably added into the preliminary polymerization slurry to control the total water content in the polymerization system to 2.5 moles to 7.0 moles per mole of the alkali metal sulfide charged, the content of water in the solvent being 7 to 30% by weight, thereby causing phase separation into the polymer phase and the solution phase, and the temperature is elevated to 245° to 290° C. to carry out polymerization. By the two-phase separated polymerization, a PAS with a melt viscosity of 1,000 poise or higher can be obtained.

If the total water content in the system is less than 2.5 moles, phase separation becomes difficult. On the other hand, if it is over 7.0 moles, the melt viscosity of the PAS formed will be lowered. Particularly, the two-phase separated polymerization is preferably conducted with a total water content ranging from 3.5 moles to 5.0 moles since then a PAS with a high viscosity can easily be obtained. Furthermore, when the polymerization temperature is less than 245° C., only a PAS with low melt viscosity can be obtained. On the other hand, if it exceeds 290° C., there is the possibility of the PAS formed or the polymerization solvent being decomposed. Particularly, the range of from 250° C. to 270° C. is preferred for producing a PAS with high melt viscosity.

The time required for the two-phase separated polymerization in the process [A] is generally 1 to 50 hours, preferably the order of 1 to 20 hours. If the two-phase separated polymerization time is too short, the condensation polymerization will be insufficient, resulting in only a PAS with low melt viscosity. On the contrary, if it is too long, decomposition may occur. Thus, the polymerization time is from 1 to 15 hours, preferably 3 to 10 hours.

Changing from the preliminary polymerization to the two-phase separated polymerization may be done either by transferring the slurry obtained in the preliminary polymerization to another reaction vessel in which the slurry is subjected to the two-phase separated polymerization conditions or by carrying out the preliminary polymerization and the two-phase separated polymerization by alteration of the polymerization conditions in the same reaction vessel. The time at which water is added may be after polymerization of the preliminary polymerization, preferably before initiation of the temperature elevation to the temperature for the two-phase separated polymerization, in the course of the temperature elevation, or immediately after elevation to the temperature for the two-phase separated polymerization, particularly before initiation of the temperature elevation. Addition of water under the state wherein the amount of the coexisting water is small after it has been maintained for long time at the temperature suitable for the two-phase separated polymerization is undesirable since a PAS with high melt viscosity cannot be obtained.

The solvent to be used in carrying out the two-phase separated polymerization may be the solvent employed in the preliminary polymerization which is the polymerization in the preceding stage, particularly a solvent mixture in which a non-solvent for PAS (particularly high molecular weight PAS), particularly water, is dissolved in an organic amide. This corresponds to the "non-good solvent" as mentioned in the present invention. The "non-good solvent" is described in detail below in the description of the process [B].

In the process [A], the polymerization system is ordinarily maintained under strongly alkaline conditions of pH 9.5 or higher without specific adjustment because a part of alkali sulfide is decomposed and changed into alkali hydroxide with emitting $H_2S$ during dehydration process and therefore it is not specifically required to adjust the pH. However, when acidic impurities are contained in the starting alkali metal sulfide, it is necessary to make the polymerization system strongly alkaline by addition of at least one member selected from alcoholates, phenolates, hydroxides, oxides and carbonates of alkali metals or the like. The term "strongly alkaline" as herein mentioned means that the pH measured when the reaction mixture is diluted 10-fold with water is in the range of from 9.5 to 14.

Process [B]

The process [B] has more steps than the process A and is characterized in that it is more suitable for obtaining an ultra-high molecular weight PAS with a melt viscosity of 7,000 poise or higher than the process [A]. The process [B] comprises purifying an arylene sulfide prepolymer with a medium to high molecular weight (5 to 3,000 poise, particularly 100 to 2,000 poise) in the purifying step and therefore carrying out the liquid-liquid phase separated polymerization as described above, thereby producing an ultra-high molecular weight PAS of 7,000 poise or higher, even some tens of thousands poise or higher in some cases, without the use of a crosslinking agent or an organic carboxylate.

In the process [B], after formation of a medium to high molecular weight PAS, a semi-solid prepolymer containing a small amount of the solvent is separated from the polymerization system slurry, which prepolymer is washed to remove harmful substances (which may be considered to include certain kinds of organic sulfide compounds and inorganic sulfur compounds) and then returned again to the poor solvent containing no harmful substances, wherein polymerization is conducted under the liquid-liquid two-phase separated state.

As an alternative for the process [B], after purifying of the PAS of medium to high molecular weight obtained by the preliminary polymerization, etc., it is dried once to a dry polymer, which is then returned again to a poor solvent containing no harmful substances, wherein polymerization is conducted under two-phase separated state. However, the process [B] is better suited for obtaining easily an ultra-high molecular weight PAS than such an alternative process.

Regardless of whether which process may be employed, preparation of the medium to high molecular weight prepolymer to be subjected to the two-phase separated polymerization step is not limited to the simple preliminary polymerization process as in the [A].

For, even a PAS prepared by the improved preliminary polymerization in a system in which, for example, Ca(OH)$_2$, CaO, organic carboxylate, etc. are added, will cause no trouble in the two-phase separated polymerization step, because such additives can be removed in the purification step.

Additionally the PAS obtained by two-phase separated polymerization can be used in the process [B].

Regardless of whether which process is employed, the prepolymer to be subjected to the two-phase separated polymerization is required to have a $\eta^*$ in the range of from 5 to 3,000 poise, preferably from 300 to 2,000 poise. With a viscosity less than 5 poise or more than 3,000 poise, it is difficult to finally obtain an ultra-high molecular weight PAS.

The amount of the organic amide used is preferably within the range of from 0.2 to 5 liters per mole of the metal sulfide employed.

The purification step of the process [B] is performed specifically as follows. The polymer after completion of the preliminary polymerization is a semi-solid containg a a small amount of an organic amide solvent. The semi-solid prepolymer can be separated easily as a wet cake by the filtration method, the decantation method, the centrifugal precipitation method, or another suitable method. When the prepolymer thus separated is in state of a mass or coarse particles, washing internally of the particles will be insufficient, and therefore it is desirable to crush the prepolymer into fine particles before washing. The washing solution is desirably a strongly alkaline solution of pH 10.0 to 14. The washing solution should also be a non-oxidizable solution, particularly preferably a slightly reductive solution. If the washing solution has a pH less than 10 or is oxidative, the alkali metal sulfide group (—SNa) at the prepolymer terminals may be denatured or decomposed. For the reasons as mentioned above, it is preferable to use as the washing solution an aqueous or alcoholic solution containing at least one of alkali metal sulfides, alkali metal alcoholates, alkali metal phenolates, alkali metal hydroxides, alkali metal oxides and alkali metal carbonates. When the washing solution is attached or remains slightly on the washed prepolymer, it is desirable to amply remove the washihg solution with the same kind of the solvent as that employed in the two-phase separated polymerization (e.g., NMP).

In the two-phase separated polymerization in the process [B], it is desirable that the polymerization system be strongly alkaline (that is, the pH of the 10-fold diluted solution should be within the range of from 9.5 to 14). A pH of less than 9.5 is undesirable since it would give rise to the possibility of substantially no reaction to increase the molecular weight or of decomposition of the polymerization system. For making the polymerization system alkaline, addition of an alkali metal alcoholate, alkali metal phenolate, alkali metal hydroxide, alkali metal oxide, alkali metal carbonate or the like is effective.

The polymerization temperature is within the range of from 245° to 290° C., more preferably from 245° to 270° C. At a temperature lower than 245° C., prolonged polymerization time is necessary, which is not desirable from the economical point of view. Also, a temperature over 290° C. is not preferable, since the polymer may decompose. The time required for polymerization is generally from 1 to 50 hours. With a time shorter than 1 hour, no sufficient increase of the molecular weight can be obtained, while the polymer may decompose if the polymerization time is longer than 50 hours.

The two-phase separated polymerization is carried out by dispersing the cleaned prepolymer which is semi-solid or in dried state, obtained in the cleaning step in an appropriate poor solvent and maintaining a specific polymerization temperature with stirring (which is not necessarily required to be a constant temperature).

For the poor solvent to be used in the two-phase separate polymerization, those which can dissolve partially the prepolymer with formation of the high viscosity phase (polymer phase) and the low viscosity phase (solution phase) at the polymerization temperature so that the molecular chains of the prepolymer may move freely to undergo condensation reaction are preferred. Also, a poor solvent having properties which will afford migration of the salt or low molecular weight PAS with certain chain length or lower formed in the polymerization from the polymer phase to the solution phase is preferred. Further, the poor solvent should also satisfy the requirements that it be stable, non-oxidative, neutral or basic at the polymerization temperature. For this solvent, it is preferable to use at least one of organic amides, aromatic hydrocarbons, aliphatic hydrocarbons, ethers, ketones, pyridine, and quinoline derivatives as described in the process [A]. Also, for the solvent, it is desirable to use a one having a medium dissolving power which will cause phase separation during polymerization. For this purpose, it is preferable to use a poor solvent decreased slightly in its dissolving power by the addition of 7 to 30 wt. % of water to a good solvent such as an organic amide. The solvent in the two-phase separated polymerization step should be used in an amount of 0.2 to 5 liters per unit of the —(Ar—S)— recurring unit of the PAS charged into the polymerization system.

The post-treatment in the polymerization process of the present invention can be carried out in a conventional manner. For example, after completion of the polymerization reaction of the two-phase separated polymerization, the reaction mixture (in slurry) can be filtered as such without dilution or after dilution with a diluting agent (water, alcohol, hydrocarbon solvent or the like), the polymer being washed with water, dehydrated and dried, thereby to recover an ultra-high molecular weight PAS. When the polymer thus filtered is in state of a mass or coarse particles, it can be pulverized by means of a mixer or the like into fine particles before washing with water, dehydration and drying, to produce a clean ultra-high molecular weight PAS.

The polymer recovered from the slurry of the two-phase separated polymerization may sometimes contain a large amount of alkalis remaining therein, and therefore it is preferable to carry out ample neutralization before washing. If the polymer is dried without neutralization, polyarylenesulfide ion complexes may undesirably be formed.

The polymerization process of the present invention is applicable for not only homopolymerization or random copolymerization but also for block copolymerizaton. For example, a purified p-phenylenesulfide prepolymer and a purified m-phenylene prepolymer can be dispersed in the same polymerization vessel to carry out the two-phase separated polymerization step, whereby a (p-phenylenesulfide)-(m-phenylenesulfide) block copolymer can readily be obtained.

Properties and Uses of the PAS Formed

From the linear PAS having a large molecular weight thus obtained of the present invention, films and fibers with very great strength and stretchability can be produced. Furthermore, molded products with extremely great impact strength and flexural strength can be obtained. The gel-spinning technique may also be applicable.

The high to ultra-high molecular weight linear PAS of the present invention can also be used as a composition mixed with at least one of synthetic resins such as polyphenylenesulfide copolymer, poly-m-phenylenesulfide, poly-p-phenylenesulfide with low to medium polymerization degree, polyetheretherketone polyethersulfone, polysulfone, polyimide, polyamide, polyphenyleneether, polyarylene, polycarbonate, polyacetal, liquid crystalline or non-liquid crystalline polyester, fluorine resin, polystyrene, polyolefin and ABS.

Further, the polymer of the present invention can also be used as a composition mixed with at least one of fibrous fillers such as glass fiber, wallastonite, potassium titanate fiber, ceramic fiber, and asbestos, and powdery fillers such as mica, silica powder, alumina powder, titanium oxide powder, calcium carbonate powder, talc, clay, and glass powder.

EXPERIMENTAL EXAMPLES

Example A1

(1) Preliminary polymerization:

A 20-liter Ti-lined autoclave was charged with 11.0 Kg of N-methyl-2-pyrrolidone (hereinafter abbreviated NMP) and 4.239 Kg (25.0 moles as $Na_2S$) of $Na_2S \cdot 5H_2O$ crystals containing 46.02 wt. % of $Na_2S$ (produced by Nagao Soda K.K.), and the temperature was elevated gradually with stirring in a nitrogen atmosphere over about 2 hours up to 203° C. to distill off 1.585 Kg of water, 1.96 Kg of NMP, and 0.58 mole of $H_2S$. In this case, the content of water in the system was changed to about 1.6 moles per mole of $Na_2S$.

After the mixture was cooled to 130° C., 3.59 Kg (24.42 moles) of p-dichlorobenzene (hereinafter abbreviated p-DCB) and 3.17 Kg of NMP were added, and polymerization was carried out at 210° C. for 10 hours to obtain a preliminary polymerization slurry (S - 1).

The residual p-DCB content in the slurry was determined by gas chromatography, from which the conversion of p-DCB was determined according to the above formula (b) for calculation of conversion. The conversion was found to be 95.0 mole %.

100 g of the slurry was taken out and subjected as it was to filtration by aspiration to remove liquid components. Then the solid was dispersed in about 1 Kg of deionized water and again subjected to filtration by aspiration for washing of the PPS produced. After this operation was repeated three times, the washed product was dried at 100° C. for 2 hours (in air atmosphere) to obtain polyphenylenesulfide (PPS) powder. A press sheet was obtained by melt pressing of the powder without pre-heating at 320° C. for 30 seconds. The melt viscosity of this sheet was measured by the use of a Kōka type flow tester (produced by Shimazu Seisakusho K.K.) at 310° C. (preheating: 5 minutes). The viscosity as calculated on the basis of a shearing rate of 200 $(sec.)^{-1}$ was 105 poise.

(2) Two-phase separated polymerization:

Into a one-liter autoclave was charged 754 g of the slurry (S - 1) (corresponding to one mole of $Na_2S$ charged). 52.2 g of water (4.5 mole/1 mole $Na_2S$ as the total water content) was added thereto, and polymerization was carried out at a temperature elevated to 250° C. in a nitrogen atmosphere for 10 hours. The conversion of p-DCB was found to be 99.0%. After cooling, pearl-like PPS were separated by screening through a screen with a mesh size of about 0.1 mm. A portion of the slurry before screening was diluted 10-fold with water, and its pH was measured to be 10.9. Then the product was neutralized with dilute hydrochloric acid, washed repeatedly with deionized water, and dried at 100° C. for 3 hours to obtain a PPS. The yield was found to be about 84%.

The pearl-like PPS thus obtained had an apparent specific gravity of 43 g/dl and a melt viscosity of 5,000 poise.

Examples A2–A8

By the use of the slurry of S - 1, two-phase separated polymerizations were carried out according to the procedure in Example 1A by varying the polymerization time within the range from 1 to 15 hours (Examples A2–A5). Also, by the use of the slurry of S - 1, two-phase separated polymerizations were carried out by varying the water content added to the co-existing water content in terms of $H_2O/Na_2S$ molar ratio of 3.0 to 5.0 (Examples A6–A8). In every case, a pearl-like PPS with high melt viscosity was obtained. The results are summarized in Table 2.

Examples A9–A19

According to substantially the same procedure as in the preliminary polymerization as in Example A1, various slurries (S-2-7, S-10-14) were obtained by varying the molar ratio (p-DCB/$Na_2S$ molar ratio), the co-existing water content ($H_2O/Na_2S$ molar ratio), the concentration charged (moles of $Na_2S$ in 1 Kg of NMP), the polymerization temperature, and the polymerization time. For each polymer, the conversion and the melt viscosity of the PPS formed were determined. The polymerization condition and the results are as shown in Table 1.

By the use of these slurries, two-phase separated polymerizations were conducted under various conditions as shown in Table 2. The results were as shown in Table 2.

Comparative Example A1

Into a one-liter autoclave was charged 754 g of the preliminary polymerization slurry (S - 1) and, without addition of water, two-phase separated polymerization was carried out in a nitrogen atmosphere at 250° C. for 10 hours.

After cooling, PPS was separated from NMP by aspirating filtration. Then the PPS was neutralized with dilute hydrochloric acid, repeatedly washed with deionized water, and dried at 100° C. for 5 hours to obtain a fine powder polymer. The yield was 98%, the melt viscosity being 80 poise and the apparent viscosity 12 g/dl. The results are summarized in Table 2.

Comparative Example A2

Following substantially the same procedure as in Example A1 except for changing the amount of co-existing water to 2.5 moles per mole of $Na_2S$, polymerization was carried out at 210° C. for 10 hours to obtain a preliminary phase polymerization slurry (S - 8). The conversion was 89.8%, and the melt viscosity of the PPS formed was 5 poise or less. The results are summarized in Table 1.

This slurry (770 g) was charged into a one-liter autoclave and, with addition of 36 g of water, two-phase separated polymerization was conducted in an nitrogen atmosphere at 250° C. for 10 hours to obtain a granular PPS. The yield was 78%, and the melt viscosity of the PPS was 430 poise. When the water content in the preliminary phase polymerization was excessive, melt viscosity could not become high, and the slurry after two-phase separated polymerization tended to decompose with generation of bad odor. The results are summarized in Table 2.

Comparative Example A3

Into a 20-liter autoclave, 12.0 Kg of NMP, 4.07 Kg (24.0 mole as $Na_2S$) of $Na_2S.5H_2O$ crystals containing 46.0 wt. % of $Na_2S$ and 3.705 Kg (25.20 moles) of p-DCB were charged and, without withdrawal of water, the reaction was carried out in a nitrogen atmosphere at 210° C. for 20 hours to obtain a preliminary polymerization slurry (S - 9). Tne conversion was 83.0%, and the melt viscosity of the PPS obtained by the preliminary polymerization was 5 poise or less. The results are summarized in Table 1.

The slurry (S - 9) (824 g) was charged into a one-liter autoclave, and two-phase separated polymerization was carried out in a nitrogen atmosphere at 250° C. for 10 hours. As a result, decomposition occurred without progress of polymerization. The granular PPS obtained in a small amount had a melt viscosity of 20 poise or less. The results are summarized in Table 2.

Comparative Example A4

The preliminary polymerization slurry obtained in Comparative Example A3 (S - 9) (824 g) was charged into a one-liter autoclave and, without addition of water, polymerization was further carried out in a nitrogen atmosphere at 210° C. for 30 hours, thus carrying out polymerization in the presence of about 5.1 moles of co-existing water per one mole of $Na_2S$ for a total period of 50 hours. As a result, the reaction mixture was found to have decomposed with generation of bad odor. The PPS recovered in a small amount had a melt viscosity of 20 poise or less.

Comparative Example A5

Into a one-liter autoclave was charged 898 g of the slurry (S - 5) (corresponding to 1.2 moles of $Na_2S$ charged). 52.2 g of water (4.5 mole/1 mole $Na_2S$ as the total water content) was added thereto, and polymerization was carried out at a temperature elevated to 250° C. in a nitrogen atmosphere for 5 hours to complete the reaction. After cooling, 150 g of the polymer was sampled, and the conversion was determined following the formula (a) for calculation of conversion. Melt viscosity of the PPS formed was also determined.

Conversion: 99.2 mole %.
Melt viscosity of PPS: 82 poise.

Then, 57.6 g of water was added to the remaining slurry (4.5 as the total amount), and the temperature was elevated again to 250° C., which the reaction was carried out for 10 hours to produce a sandy or granular PPS. The yield was 68%, the apparent specific gravity being 31 g/dl and the melt viscosity 900 poise.

If the conversion is too great in the preliminary polymerization, the melt viscosity will not be increased even though two-phase separated polymerization may be conducted under the conditions of the present invention.

Example A20

A 10-liter autoclave was charged with 4,500 g of NMP and 1,696 g (10 moles as $Na_2S$) of $Na_2S.5H_2O$ crystals containing 46.02 wt. % of $Na_2S$, and the temperature was elevated gradually with stirring in a nitrogen atmosphere up to 202° C. to distill off 683 g of water, 417 g of NMP, and 0.31 mole of $H_2S$. In this case, the content of water in the system was changed to about 1.33 moles per mole of $Na_2S$. After the mixture was cooled to 130° C., 1439 g of p-DCB (p-DCB/$Na_2S$ molar ratio 1.01/1.00) and 762 g of NMP were added, and polymerization was carried out at 210° C. for 10 hours to obtain a preliminary polymerization slurry. A small amount of this slurry was sampled for examination. The conversion was found to be 93.5%, and the melt viscosity of the PPS formed was about 100 poise.

Next, without cooling the preliminary polymerization slurry, 466 g of water was pressurized thereinto with nitrogen (to a total water content of 4.0 moles per mole of $Na_2S$), and the temperature of the mixture was elevated to 260° C., which two-phase separated polymerization was carried out for 10 hours. The conversion of p-DCB was 99.4%. Subsequently, by the same procedure as in Example 1A, pearl-like PPS was recovered. The polymer yield was 86%, and the melt viscosity 7,400 poise.

Comparative Example A6

A one-liter autoclave was charged with 754 g of the preliminary polymerization slurry (S - 1) and, without addition of water (total water content of 1.6 moles per mole of $Na_2S$), polymerization was carried out in a nitrogen atmosphere at a temperature elevated to 250° C. to complete the reaction. Then, without cooling of the mixture, 52.2 g of water was pressurized thereinto with nitrogen gas. The temperature was once lowered to about 220° C., and the mixture was heated again to 250° C., whereupon heating was immediately discontinued. Recovery of the polymer according to the same procedure as in Example 1 produced a granular (non-spherical) PPS. The conversion of p-DCB was 99.3%, the yield being 70% and the melt viscosity of PPS 260 poise.

Comparative Example A7

A one-liter autoclave was charged with 754 g of a slurry (S - 1) obtained by polymerization at 210° C. for 10 hours under the condition of a content of 1.6 moles of $H_2O$ per mole of $Na_2S$, and, with addition of 52.2 g of water (4.5 moles of total water content per mole of $Na_2S$), the temperature was elevated in a nitrogen atmosphere from room temperature to 250° C. over about one hour. On reaching 250° C., the mixture was immediately cooled. The conversion of p-DCB was found to be 95.8%. Subsequently, the same post-treatment as in Example A1 was conducted. A granular (non-spherical) PPS was obtained. The polymer yield was about 68%, and the melt viscosity was 400 poise.

Example A21

Preliminary polymerization was carried out under exactly the same conditions as in Example A1, and this step was followed by two-phase separated polymerization at 250° C. for 10 hours. Next, after the mixture had been maintained at 250° C. for 30 minutes while stopping stirring, the mixture was cooled to room temperature over about 2 hours with the stirring being stopped.

to be formed during the two-phase separated polymerization and hardened thereafter gradually to the extent which will not cause fusion of the particles.

TABLE 1

Preliminary polymerization slurry

| Slurry | Polymerization Conditions | | | | | Conversion of preliminary polymerization (mole %) | Viscosity of polymer formed (poise) | Remarks |
|---|---|---|---|---|---|---|---|---|
| | Concentration charged ($Na_2S$ mole/ KgNMP) | Monomer ratio (p-DCB/$Na_2S$ molar ratio) | Co-existing water amount ($H_2O$/$Na_2S$ molar ratio) | Polymerization temperature (°C.) | Polymerization time (hours) | | | |
| S-1 | 2.00 | 1.00 | 1.6 | 210 | 10 | 95.0 | 105 | Example |
| 2 | " | " | " | " | 5 | 90.8 | 50 | " |
| 3 | " | " | " | " | 20 | 96.7 | 250 | " |
| 4 | " | " | 1.1 | " | 10 | 95.6 | 125 | " |
| 5 | " | 1.02 | 1.3 | " | 10 | 96.0 | 94 | " |
| 6 | " | 1.00 | 1.4 | " | 10 | 95.7 | 84 | " |
| 7 | " | " | 2.0 | " | 10 | 95.1 | 45 | " |
| 8 | " | " | 2.5 | " | 10 | 89.8 | <5 | Comp. Example |
| 9 | " | 1.05 | 5.1 | " | 20 | 83.0 | <5 | Comp. Example |
| 10 | " | 1.00 | 1.4 | " | 1 | 56.4 | 6 | Example |
| 11 | " | " | " | " | 3 | 77.3 | 6 | " |
| 12 | " | 1.01 | 1.5 | 220 | 5 | 92.4 | 45 | " |
| 13 | " | " | " | 230 | 5 | 94.5 | 35 | " |
| 14 | 2.50 | 1.01 | 1.4 | 210 | 10 | 93.2 | 40 | " |

TABLE 2

Two-phase separated polymerization results

| No. | Polymerization Conditions | | | | | | Conversion (%) | Yield (%) | Melt viscosity poise | Remarks |
|---|---|---|---|---|---|---|---|---|---|---|
| | Two-phase separated polymerization slurry | p-DCB/ $Na_2S$ molar ratio | Co-existing water amount ($H_2O$/$Na_2S$ molar ratio) | pH* | Polymerization temperature (°C.) | Polymerization time (hours) | | | | |
| Exam. | | | | | | | | | | |
| A1 | S-1 | 1.00 | 4.5 | 10.9 | 250 | 10 | 99.0 | 84 | 5000 | |
| A2 | " | " | " | 9.8 | " | 1 | 97.4 | 72 | 1300 | |
| A3 | " | " | " | 10.0 | " | 3 | 98.6 | 74 | 2100 | |
| A4 | " | " | " | 10.3 | " | 5 | 98.6 | 79 | 3060 | |
| A5 | " | " | " | 11.0 | " | 15 | 99.3 | 82 | 4800 | |
| Comp. Exam. | | | | | | | | | | |
| A1 | " | " | 1.6 | 9.3 | " | 10 | 99.6 | 98 | 80 | |
| Exam. | | | | | | | | | | |
| A6 | " | " | 3.0 | 11.2 | " | " | 98.9 | 78 | 3200 | |
| A7 | " | " | 4.0 | 10.8 | " | " | 98.9 | 83 | 4500 | |
| A8 | " | " | 5.0 | 10.9 | " | " | 99.1 | 85 | 3400 | |
| A9 | S-2 | " | 4.5 | 9.9 | 250 | 10 | 98.7 | 79 | 3300 | |
| A10 | S-3 | " | " | 10.7 | " | " | 99.5 | 79 | 3800 | |
| A11 | S-4 | " | " | 11.0 | " | " | 99.0 | 83 | 5000 | |
| A12 | S-5 | 1.02 | " | 10.2 | " | " | 99.2 | 86 | 3500 | |
| A13 | S-6 | 1.00 | " | 11.2 | " | " | 98.9 | 82 | 7000 | |
| A14 | S-7 | " | " | 11.0 | " | " | 98.9 | 83 | 5600 | |
| Comp. Exam. | | | | | | | | | | |
| A2 | S-8 | 1.00 | 4.5 | 7.4 | 250 | 10 | 98.5 | 78 | 430 | |
| A3 | S-9 | 1.05 | 5.1 | 6.9 | " | " | 98.8 | — | <20 | |
| Exam. | | | | | | | | | | |
| A15 | S-10 | 1.00 | 4.5 | 9.7 | — | — | 98.4 | 69 | 1800 | Slightly tending to decompose |
| A16 | S-11 | " | " | 9.8 | " | " | 98.6 | 81 | 2100 | Slightly tending to decompose |
| A17 | S-12 | 1.01 | 4.5 | 11.2 | 260 | 10 | 99.3 | 86 | 6000 | |
| A18 | S-13 | 1.01 | 4.5 | 11.2 | 260 | 10 | 99.3 | 85 | 5200 | |
| A19 | S-14 | 1.01 | 4.0 | 10.9 | 255 | 10 | 99.2 | 87 | 3000 | |

*Value measured for the slurry after the reaction diluted 10-fold with water.

Following subsequently the same post-treatment as in Example A1, substantially pearl-like PPS was obtained. The yield was 83%, and the melt viscosity 5,400 poise.

The particle size distribution was found to be approximately the same as in Example A1, without flattening or fusion of individual particles. Thus, pearl-like particles are not formed in the course of cooling after two-phase separated polymerization, but they are considered Example B1

(1) Preliminary polymerization step:

A Ti-lined 20-liter autoclave was charged with 1.0 Kg of NMP and 25.0 moles of $Na_2S.5H_2O$, and the residual water content in the vessel was controlled to 1.5 moles per mole of Na₂S charged by distilling off water and a slight amount of NMP while elevating the temperature of the mixture up to about 200° C. During this operation, 0.59 mole of $H_2S$ was also distilled off. With addition of 24.41 moles of p-dichlorobenzene and 3.15 Kg of NMP to the mixture, polymerization was carried out at 212° C. for 7 hours to obtain a polymerized slurry. The polymer in the slurry was found to have a $\eta^*$ of 120 poise.

To the polymerized slurry were added 75 moles of water (total water content 4.5 moles/mole of Na₂S charged), and two-phase separated polymerization was carried out at 260° C. for one hour to obtain a prepolymer slurry (S-B1). The polymer in the (S-B1) was found to have a $\eta^*$ of 610 poise.

(2) Purification step-two-phase separated polymerization step:

By filtration of 1,000 g of the slurry (S-B₁), the liquid phase was separated to obtain a solid, which was washed with an aqueous solution of Na₂S with pH 12.8 (Na₂S=1 wt. %) to obtain a coarse particulate prepolymer. This polymer was crushed with a mixer into coarse particles of about 2 mm or smaller, again washed with the aqueous Na₂S solution with pH 12.8, and then washed twice with NMP to remove adherent water to obtain a wet cake of the purified polymer. (Completion of the purification step)

The wet cake was transferred into a one-liter autoclave and, with addition of 550 ml of NMP containing 12.5 wt. % of water, heated at 255° C. for 4 hours to carry out two-phase separated polymerization (pH of 10-fold diluted slurry=10.1). After completion of the reaction, the particulate polymer was filtered from the polymerized slurry, crushed with a mixer into particles of 2 mm or smaller, neutralized with dilute hydrochloric acid, washed with water, dehydrated and dried to produce the final polymer. This polymer was found to have a $\eta^*$ of 14,500 poise.

Example B2

The steps of cleaning and two-phase separated polymerization (pH after 10-fold dilution of slurry=10.2) were practiced according to the procedures in Example B1 except for carrying out purification of the polymer in the slurry (S-B1) of Example B1 with an aqueous solution with pH=13.2 (Na₂S 2.3%) and carrying out two-phase separated polymerization at 260° C. for 4 hours to obtain a final polymer. This polymer was found to have a $\eta^*$ of 18,000 poise.

Example B3

The steps of cleaning and two-phase separated polymerization (pH after 10-fold dilution of slurry=9.9) was practiced according to the procedures in Example B1 except for carrying out two-phase separated polymerization by the use of the polymer in the slurry (S-B1) of Example B1 and 600 ml of a solvent mixture of NMP containing 9.5 wt. % of water/isopropylnaphthalene=85/15 (weight ratio) to obtain a final polymer. This polymer was found to have a $\eta^*$ of 10,500 poise.

Example B4

The polymer in the slurry (S-B1) of Example B1 was employed. Except for carrying out washing in the purification step with an aqueous Na₂S solution with pH 13.2 and carrying out two-phase separated polymerization at 255° C. for 15 hours, the procedures of the cleaning step and the two-phase separated polymerization step (pH after 10-fold dilution of slurry=10.1) as in Example B1 were repeated to obtain a final polymer. This polymer was found to have a $\eta^*$ of 10,100 poise.

Example B5

(1) Preliminary polymerization step:

A one-liter autoclave was charged with 550 g of NMP and 1.5 mole of Na₂S.5H₂O, and water and a small amount of NMP were distilled off while the temperature was elevated to about 200° C. to control the residual water content in the vessel to 1.5 mole per mole of Na₂S charged. During this operation, 0.03 mole of $H_2S$ was also distilled off.

1.22 mole of p-dichlorobenzene and 160 g of NMP were added to the mixture, and preliminary polymerization was carried out at 220° C. for 4 hours to obtain a polymerized slurry. The polymer formed in this slurry was found to have a $\eta^*$ of 95 poise.

To the slurry was added 3.75 moles of water (total water content=4.5 moles/mole of Na₂S charged), and two-phase separated polymerization was carried out to obtain a prepolymer slurry (S-B2). The polymer formed in this slurry (S-B2) was found to have a $\eta^*$ of 1,900 poise.

(2) Purification and two-phase separated polymerization:

The purification step and the two-phase separated polymerization step of Example B1 were repeated except for the use of the polymer in (S-B2) obtained in the step (1) and NMP containing 20 wt. % of water as the solvent in the two-phase separated polymerization step to obtain a final polymer (pH of slurry diluted to 10-fold=9.8). This polymer was found to have a $\eta^*$ of 12,000 poise.

Comparative Example B1

The polymer in the slurry (S-B1) of Example B1 was employed. The purification and two-phase separated polymerization steps were practiced according to the procedures in Example B2 except for the use of an aqueous sodium peroxide solution with pH 13.2 in place of the aqueous Na₂S solution with pH 13.2 in the purification step. The polymer was completely decomposed, and recovery of the final polymer was impossible.

Comparative Example B2

The polymer in the slurry (S-B1) of Example B1 ($\eta^*$=610 poise) was employed. The purification and the two-phase separated polymerization steps (pH of slurry diluted to 10-fold=8) were practiced according to the procedures in Example B1 except for using NMP containing 60 wt. % of water as the solvent in the two-phase separated polymerization step to obtain a final polymer. The polymer was found to have a $\eta^*$ of 690 poise, indicating substantially no increase in viscosity.

Example B6

A 10-liter Ti-lined autoclave equipped with stirring blades was charged with 70 liters of NMP, and 7.5 moles of Na₂S.3H₂O and 15.0 moles of CaO were added into the autoclave, which was then sealed. After replacement with N₂, under stirring, dehydrating reaction with CaO was carried out by heating the mixture at 160° C. for one hour. Then a mixture of 0.5 liter of NMP and 7.5 moles of p-DCB was added, and polymerization was conducted for 5.0 hours, while the inner temperature in the autoclave was controlled at 200° C. After the reaction, solids were separated from the reaction mixture, neutralized with dil. HCl, thoroughly washed with water until the pH of washing became approximately 7.0, dehydrated, and dried in vacuo at 80° C. to obtain a prepolymer. The fine powdery prepolymer was found to have a melt viscosity of 590 poise.

The fine powdery prepolymer (54.0 g) was charged into a one-liter Ti-lined autoclave, and 600 g of NMP, 97 g of water, and 2.0 g of C$_2$H$_5$ONa were added thereto. The temperature was then elevated to 260° C., at which two-phase separated polymerization was conducted for 4 hours. The polymerized slurry (pH of slurry diluted 10-fold with water=11.5) was screened, and the polymer thus obtained was thoroughly neutralized with dil. HCl, washed with water, and dried in vacuo at 80° C. to obtain a final polymer. This polymer was found to have a melt viscosity of 39,000 poise.

Comparative Example B3

Two-phase separated polymerization was carried out under the conditions set forth in Example B6 except for omission of addition of C$_2$H$_5$ONa. The slurry obtained was found to have a decomposition odor, the pH of the slurry diluted 10-fold with water being 7.3. The final polymer obtained had a $\eta^*$ value of only 20 poise.

What is claimed is:

1. A process for producing a high molecular to ultra-high molecular weight linear polyarylenesulfide, which comprises:
    providing a prepolymer which is an arylenesulfide polymer having a melt viscosity of 5 to 3,000 poise measured at 310° C. and a shear rate of 200 sec$^{-1}$;
    placing the prepolymer in a solvent which consists essentially of a strongly alkaline mixture of an organic amide and 7 to 30% by weight of water;
    heating said prepolymer in said solvent at a temperature of from 245° to 290° C., whereby a mass is formed in a liquid-liquid two phase state wherein the prepolymer is present mostly in one of the two phases;
    maintaining the liquid-liquid two-phase state for 1 to 50 hours thereby to convert the prepolymer into an arylenesulfide polymer of a higher molecular weight; and
    recovering the arylenesulfide polymer of a higher molecular weight,
    the alkalinity of said strongly alkaline mixture being such that when diluted 10-fold with water, the pH thereof is 9.5 to 14.

2. the process according to claim 1, wherein said prepolymer is an arylene sulfide polymer wherein the arylenesulfide moiety is at least one member selected from the group consisting of a p-arylenesulfide moiety and an m-arylenesulfide moiety.

3. The process according to claim 1, wherein said alkalinity is attained by the addition, to the solvent, of at least one member selected from the group consisting of an alkali metal alcoholate, an alkali metal phenolate, an alkali metal hydroxide, an alkali metal oxide and an alkali metal carbonate.

4. A process for producing a high molecular weight to ultra-high molecular weight linear polyarylenesulfide, which comprises:
    heating an alkali metal sulfide and a dihalo-armoatic compound in an organic amide containing 0.5 to 2.4 moles of water per mole of the alkali metal sulfide charged, at a temperature of from 180° C. to 240° C., until an arylenesulfide polymer having a melt viscosity of 5 to 300 poise determined at 310° C. and a shear rate of 200 sec$^{-1}$ is formed with a conversion of the dihalo-aromatic compound of 70 to 98 mole % thereby form a prepolymer in a reaction mixture;
    adding additional water to the reaction mixture thus formed in a quantity of 2.5 to 7.0 moles per mole of the alkali metal sulfide charged; and
    heating the reaction mixture thus formed at a temperature of from 245° C. to 290° C. under strongly alkaline conditions, whereby a mass is formed in a liquid-liquid two phase state wherein the prepolymer is present mostly in one of the two phases;
    maintaining the liquid-liquid two-phase state for 1 to 50 hours thereby to convert the prepolymer into an arylenesulfide polymer of a higher molecular weight; and
    recovering the arylenesulfide polymer of a higher molecular weight,
    said strongly alkaline conditions being such that the pH of the reaction mixture when diluted 10-fold, is from 9.5–14.

5. The process according to claim 4, wherein the dihalo-aromatic compound comprises at least one member selected from the group consisting of a p-dihalobenzene and a m-dihalobenzene.

6. The process according to claim 4, wherein the strongly alkaline condition is attained by the addition, to the solvent, of at least one member selected from the group consisting of an alkali metal alcoholate, an alkali metal phenolate, an alkali metal hydroxide, an alkali metal oxide and an alkali metal carbonate.

7. The process according to claim 1, wherein said prepolymer is a wet product obtained by the reaction of an alkali metal sulfide with a dihalo-aromatic compound in an organic amide containing a lower quantity of water per mole of the alkali metal sulfide charged, at a temperature of 180° C. to 290° C., until an arylenesulfide polymer having a melt viscosity of 100 to 3,000 poise is formed, separating the polymer, and washing the polymer with a non-oxidative alkali solution.

8. The process according to claim 1, wherein said prepolymer is a dry product of a polyarylenesulfide having a melt viscosity of 5 to 3,000 poise which has been produced by the reaction of an alkali metal sulfide and a dihaloaromatic compound in a solvent, followed by separating the polymer thus produced, washing of the polymer with a non-oxidative alkali solution and drying.

9. The process according to claim 7, wherein the non-oxidative alkali solution is an aqueous solution with a pH of 10 to 14 containing at least one member selected from the group consisting of an alkali metal sulfide, an alkali metal alcoholate, an alkali metal phenolate, an alkali metal hydroxide, an alkali metal oxide and an alkali metal carbonate.

10. The process according to claim 4, wherein the strongly alkaline condition is attained solely by the alkalinity inherent in the previous step.

11. The process according to claim 1, wherein the organic amide is N-methylpyrrolidone.

12. The process according to claim 4, wherein the organic amide is N-methylpyrrolidone.

13. The process according to claim 8, wherein the non-oxidative alkali solution is an aqueous solution with a pH of 10 to 14 containing at least one member selected from the group consisting of an alkali metal sulfide, an alkali metal alcoholate, an alkali metal phenolate, an alkali metal hydroxide, an alkali metal oxide and an alkali metal carbonate.

14. The process according to claim 4, wherein the quantity of the organic amide is from 0.2 to 5 liters per mole of the metal sulfide employed.

15. The high molecular weight linear polyphenylenesulfide produced by the process of claim 1.

16. The high molecular weight linear polyphenylenesulfide produced by the process of claim 4.

17. A high molecular weight linear polyphenylenesulfide which has a melt viscosity of at least 7,000 measured at a temperature of 310° C. under a shear rate of 200 $sec^{-1}$ and is substantially free of a cross-linked structure.

* * * * *

UNITED STATES PATENT AND TRADEMARK OFFICE
CERTIFICATE OF CORRECTION

PATENT NO. : 4,645,826    Page 1 of 6

DATED : February 24, 1987

INVENTOR(S) : Iizuka, et al.

It is certified that error appears in the above-identified patent and that said Letters Patent are hereby corrected as shown below:

Col. 3, line 3, please delete "ArX + MS-Ar ---> Ar-S-Ar + MX" and insert --∽ArX + MS - Ar∽ ---> ∽Ar - S - Ar∽ + MX--.

Col. 3, line 9, please delete "to form to a high" and insert --to form a high--.

Col. 3, line 21, please delete "phase. Such phase is" and insert --phase, is--.

Col. 5, line 53, please delete "160 to 270°C" and insert --160° to 260°C--.

Col. 5, line 55, please delete "8 mole %" and insert --98 mole %--.

Col. 6, line 37, please delete "that the timing" and insert --that time--.

Col. 7, line 7, please delete "viscosity" and insert --melt viscosity--.

Col. 7, line 10, please delete "viscosity" and insert --melt viscosity--.

Col. 7, line 33, please delete "viscosity" and insert --melt viscosity--.

Col. 7, lines 48-50, please delete "Thus, the polymerization time is from 1 to 15 hours, preferably 3 to 10 hours".

UNITED STATES PATENT AND TRADEMARK OFFICE
CERTIFICATE OF CORRECTION

PATENT NO. : 4,645,826
DATED : February 24, 1987
INVENTOR(S) : Iizuka, et al.

It is certified that error appears in the above-identified patent and that said Letters Patent are hereby corrected as shown below:

Col. 8, line 12, please delete "'non-good solvent'" and insert --poor solvent--.

Col. 8, line 13, please delete "'non-good solvent'" and insert --poor solvent--.

Col. 8, line 31, please delete "A" and insert --[A]--.

Col. 8, line 34, please delete "higher than the process" and insert --higher than is the process--.

Col. 8, line 55, please delete "for" and insert --to--.

Col. 8, line 56, please delete "of the PAS of" and insert --the PAS of--.

Col. 8, line 68, please delete "in the [A]" and insert -- in the process [A]--.

Col. 9, line 11, please delete "$\eta^*$" and insert --melt viscosity ($\eta^*$)--.

Col. 9, lines 12-13, please delete "300 to 2,000 poise" and insert --100 to 2,000 poise--.

Col. 9, line 18, please insert --starting-- before "metal sulfide".

Col. 9, line 21, please delete "containg" and insert --containing--.

UNITED STATES PATENT AND TRADEMARK OFFICE
CERTIFICATE OF CORRECTION

PATENT NO. : 4,645,826
DATED : February 24, 1987
INVENTOR(S) : Iizuka, et al.

It is certified that error appears in the above-identified patent and that said Letters Patent are hereby corrected as shown below:

Col. 9, line 22, please delete "a a small" and insert --a small--.

Col. 9, line 45, please delete "washihg" and insert --washing--.

Col. 9, lines 61-62, please delete "245 to 270°C" and insert --250° to 270°C--.

Col. 10, line 28, please delete "use a one" and insert --use one--.

Col. 10, line 38, please delete "post-treatment in the" and insert --post-treatment of the--.

Col. 10, line 64, please delete "m-phenylene prepolymer" and insert --m-phenylenesulfide prepolymer--.

Col. 11, lines 32-33, please delete "abbreviated NMP" and insert --abbreviated as NMP--.

Col. 11, line 57, please delete "in air" and insert --in an air--.

Col. 11, lines 59-60, please delete "powder without preheating at" and insert --powder, without preheating, at--.

Col. 12, line 19, please delete "slurry of S-1" and insert --slurry (S-1)--.

UNITED STATES PATENT AND TRADEMARK OFFICE
CERTIFICATE OF CORRECTION

PATENT NO. : 4,645,826
DATED : February 24, 1987
INVENTOR(S) : Iizuka, et al.

It is certified that error appears in the above-identified patent and that said Letters Patent are hereby corrected as shown below:

Col. 12, line 21, please delete "Example 1A" and insert --Example A1--.

Col. 12, line 23, please delete "slurry of S-1" and insert --slurry (S-1)--.

Col. 12, line 60, please delete "the apparent viscosity" and insert --the apparent specific gravity--.

Col. 12, line 68, please delete "phase."

Col. 13, line 10, please delete "phase."

Col. 13, lines 51-52, please delete ".52.2 g of water (4.5 mole/.1 mole $Na_2S$ as the total water content) was added thereto."

Col. 13, line 62, please delete "4.5" and insert --4.5 moles--.

39. Col. 13, line 63, please delete "which" and insert --at which--.

Col. 13, line 68, please delete "be increased" and insert --increase--.

Col. 14, line 25, please delete "to 260°C., which" and insert --to 260°C., at which--.

Col. 14, line 38, please delete "without cooling of" and insert --without cooling--.

UNITED STATES PATENT AND TRADEMARK OFFICE
CERTIFICATE OF CORRECTION

PATENT NO. : 4,645,826

DATED : February 24, 1987

INVENTOR(S) : Iizuka, et al.

It is certified that error appears in the above-identified patent and that said Letters Patent are hereby corrected as shown below:

Table 1, 8th column, please delete "Viscosity" and insert --Melt Viscosity--.

Table 2, 6th column, line "Exam A15", please delete "-" and insert --"--.

Table 2, 7th column, line "Exam A15", please delete "-" and insert --"--.

Col. 16, lines 66-67, please delete "1.0 Kg" and insert --11.0 Kg--.

Col. 17, lines 16-17, please delete "Purification step-two-phase separation polymerization step" and insert --Purification step and two-phase separated polymerization step--.

Col. 18, line 8, please delete "1.5 mole" and insert --1.25 mole--.

Col. 18, line 21, please insert --at 260°C for 2.0 hours-- after "carried out".

Col. 18, line 59, please delete "70 liters" and insert --7.0 liters--.

Col. 19, line 49, please delete "the process" and insert --The process--.

Col. 19, line 63, please delete "armoatic" and insert --aromatic--.

UNITED STATES PATENT AND TRADEMARK OFFICE
CERTIFICATE OF CORRECTION

PATENT NO. : 4,645,826
DATED : February 24, 1987
INVENTOR(S) : Iizuka, et al.

It is certified that error appears in the above-identified patent and that said Letters Patent are hereby corrected as shown below:

Col. 19, lines 66-67, please delete "180°C to 240°C" and insert --180°C to 235°C--.

Col. 20, line 3, please delete "form" and insert --forming--.

Col. 22, line 4, please delete "7,000" and insert --7000 poise--.

Signed and Sealed this

Fourth Day of April, 1989

Attest:

DONALD J. QUIGG

Attesting Officer

Commissioner of Patents and Trademarks